United States Patent [19]

Gervé et al.

[11] 4,027,157
[45] May 31, 1977

[54] DEVICE FOR MEASURING WEAR BY RADIOACTIVE RADIATION

[75] Inventors: Andreas Gervé, Linkenheim; Hartmut Haury; Wolfram Lausch, both of Karlsruhe, all of Germany

[73] Assignee: Gesellschaft fur Kernforschung m.b.H., Karlsruhe, Germany

[22] Filed: Feb. 10, 1976

[21] Appl. No.: 656,953

[30] Foreign Application Priority Data

Feb. 20, 1975 Germany .......................... 2507172

[52] U.S. Cl. .............................. 250/303; 250/364; 250/432 R
[51] Int. Cl.$^2$ ........................................ G01T 1/161
[58] Field of Search .............. 250/303, 364, 432 R, 250/301

[56] References Cited

UNITED STATES PATENTS

| 2,738,426 | 3/1956 | Hurst .............................. 250/432 R |
| 2,939,011 | 5/1960 | Bisso et al. ........................ 250/303 |
| 2,957,986 | 10/1960 | Quigg ................................ 250/303 |
| 3,953,737 | 4/1976 | Neeb et al. ..................... 260/432 R |

*Primary Examiner*—Harold A. Dixon
*Attorney, Agent, or Firm*—Spencer & Kaye

[57] ABSTRACT

A device for measuring the wear of a radioactively marked machine component by sensing the presence of radioactive wear fragments in a lubricant has a flow-through chamber; an inlet for tangentially introducing the lubricant into the flow-through chamber; a radiation detector at least partially surrounded by the flow-through chamber; and an outlet for removing the lubricant from the flow-through chamber. The device further includes an outer hollow cylinder having a closed radial end face; an inner hollow cylinder having a closed radial end face and an outer diameter which is smaller than the inner diameter of the outer hollow cylinder. The inner hollow cylinder is supported coaxially within the outer hollow cylinder and the space between the two cylinders constitutes the flow-through chamber. The cylinders are supported in a substantially horizontal orientation. There is further provided a vacuum vessel positioned in the inner hollow cylinder; the radiation detector is supported within the vacuum vessel coaxially with the cylinder axis. The radiation detector is surrounded by a heat conducting arrangement within the vacuum vessel for transmitting heat generated by the radiation detector into the outer environment. The cylinders are surrounded by a radiation shield assembly formed off a first shield part protecting the detector from natural environmental radiation and a second shield part protecting the detector from the radioactive radiation emitted by the machine component.

14 Claims, 2 Drawing Figures

DEVICE FOR MEASURING WEAR BY RADIOACTIVE RADIATION

BACKGROUND OF THE INVENTION

This invention relates to a mobile device for measuring the wear of a radioactively marked machine component by sensing the presence of radioactive abraded particles (hereinafter referred to as "wear fragments") which are contained in lubricating oil or other lubricant serving as a carrier liquid. The carrier liquid is introduced through an inlet tangentially into a flow-through chamber, then is passed in front of a radiation detector and is eventually withdrawn from the chamber through an outlet. The chamber at least partially surrounds the radiation detector and is itself surrounded by a radiation shield.

For measuring the extent of wear with radionuclides in an environment including a lubricating circuit, generally the wear with respect to the activity of the lubricant is measured. In case a modification of the internal lubricant circuit is not considered, such a flow-through measuring method is by far the most sensitive. In this connection, reference is made to Stegemann and Kaspar-Sickermann, *Methoden und Ergebnisse der Verschleissmessung an Kolbenringen mit Hilfe radioaktiver Isotope* (Methods and Results Pertaining to the Measurement of Piston Ring Wear by Means of Radioactive Isotopes,), appeared in Issue 18, 1961, published by Forschungsvereinigung Verbrennungskraftmaschinen e.V., Frankfurt/Main.

The principle of the flow-through measuring process is based on the condition that the wear fragments abraded from the radioactively marked machine (engine) components are first introduced into the lubricant circuit. The lubricant is withdrawn from the deepest location of the pan by a pump operating independently of the engine and is driven back into the engine through a measuring chamber surrounding a radiation detector. The detector is generally constituted by a NaI(Tl) scintillation crystal which has an energy resolution capacity sufficient even for the three-component measurements, as well as good responding probability. The gamma radiation sensed by the scintillation crystal makes possible a determination concerning the type and the quantity of the fragments present in the lubricant circuit. The energy of the gamma quanta characterizes the components exposed to wear, thus making possible the separation of the various proportions of wear in case of multiple-component measurements. The intensity of the radiation, that is, the recorded count rate, is a measure for the quantity of the wear fragments.

German Laid-Open Application (Offenlegungsschrift) No. 22 61 667 discloses a measuring device of the type outlined above. The base of the flow-through chamber has a funnel-shaped configuration and has an outlet at its deepest location. This measuring device, however, is disadvantageous because, due to its substantial weight, it cannot find application in smaller vehicles or mobile systems and, further, it needs, for the detector, a cooling system (operating, for example, on the principle of water cooling) which can be adapted to mobile systems only with difficulty and only in a complex manner.

SUMMARY OF THE INVENTION

It is an object of the invention to provide an improved measuring device of the afore-outlined type which can find safe application even in small vehicles, which measures, with a sufficiently high sensitivity, the wear of even those components which are activated only in a thin layer and in which it is ensured that the wear fragments are introduced into an oil sump forming an engine or machine component.

It is a further object of the invention to provide an improved measuring device of the above type, wherein the weight of the measuring device is so designed that the maximum predetermined weight of the vehicle or the mobile system is not exceeded, the properties of motion of the mobile system are not adversely affected and no complex detector cooling system is needed.

These objects and others to become apparent as the specification progresses, are accomplished by the invention, according to which, briefly stated, the device for measuring the wear of a radioactively marked machine component by sensing the presence of radioactive wear fragments in a lubricant has a flow-through chamber; an inlet for tangentially introducing the lubricant into the flow-through chamber; a radiation detector at least partially surrounded by the flow-through chamber; and an outlet for removing the lubricant from the flow-through chamber. The device further includes an outer hollow cylinder having a closed radial end face; an inner hollow cylinder having a closed radial end face and an outer diameter which is smaller than the inner diameter of the outer hollow cylinder. The inner hollow cylinder is supported coaxially within the outer hollow cylinder and the space between the two cylinders constitutes the flow-through chamber. The cylinders are supported in a substantially horizontal orientation. There is further provided a vacuum vessel positioned in the inner hollow cylinder; the radiation detector is supported within the vacuum vessel coaxially with the cylinder axis. The radiation detector is surrounded by a heat conducting arrangement within the vacuum vessel to preserve the detector of transmitting rest heat from the outer environment through the vacuum vessel. The cylinders are surrounded by a radiation shield assembly formed of a first shield part protecting the detector from natural environmental radiation and a second shield part protecting the detector from the radioactive radiation emitted by the machine component.

Advantageously, the inner cylinder may, at the same time, form the outer wall of the vacuum vessel which is of the double-wall type.

In accordance with a preferred embodiment of the invention, the radiation detector is supported in the vacuum vessel by a cushioning material that protects it against mechanical jars and vibrations.

According to another preferred embodiment of the invention, the outer cylinder of the flow-through chamber has, at that end which is remote from its closed radial end face, a circumferential ring which interconnects the inner and the outer cylinders with one another by the interposition of a gasket. Further, the base of the flow-through chamber — the base being constituted by the radial end face of the outer cylinder — has an inwardly convex configuration.

According to a particularly advantageous embodiment of the invention, there is provided a partial radiation shield formed of individual rings and an additional radiation shield formed of individual discs. The shield discs are attached to the foremost shield ring which, in turn, constitutes the outer radial end of the flow-through chamber.

The particular advantages of the invention reside in that the weight of the radiation shield is reduced by forming it of two units, one serving only as a shield to protect the device from the natural underground radiation, whereas the second radiation shield unit is arranged to protect the device from the radiation of the radioactively marked engine components. Further, instead of the conventional detector cooling arrangement, there is provided a detector insulation including a vacuum vessel in conjunction with a heat exchanging copper insert forming a component of the apparatus. Expediently, the detector insulation surrounds a Dewar vacuum vessel made of glass or metal (or is an integrated metal-Dewar system) and a copper insert within the vacuum vessel. The copper insert, by virtue of its heat conductivity, removes the small heat current from the vessel and releases the heat into the environment with the aid of small ventilators which blow air on the copper insert. Further, the measuring chamber, by virtue of its horizontal disposition, ensures that dead water, air pockets or a deposition of wear fragments cannot occur. Thus, the salient advantages of the measuring apparatus according to the invention are the small weight, the uncomplicated but very effective protection of the detector from heat and the optimally arranged measuring chamber. Further, the measuring results are not appreciably affected by more difficult conditions in field tests, by an oblique position of the vehicle or the mobile system or during accelerations or foaming of the lubricant. The measuring device fulfills all preconditions to find application in stationary systems at test stands as well.

DESCRIPTION OF THE PREFERRED EMBODIMENT

Figure 1:
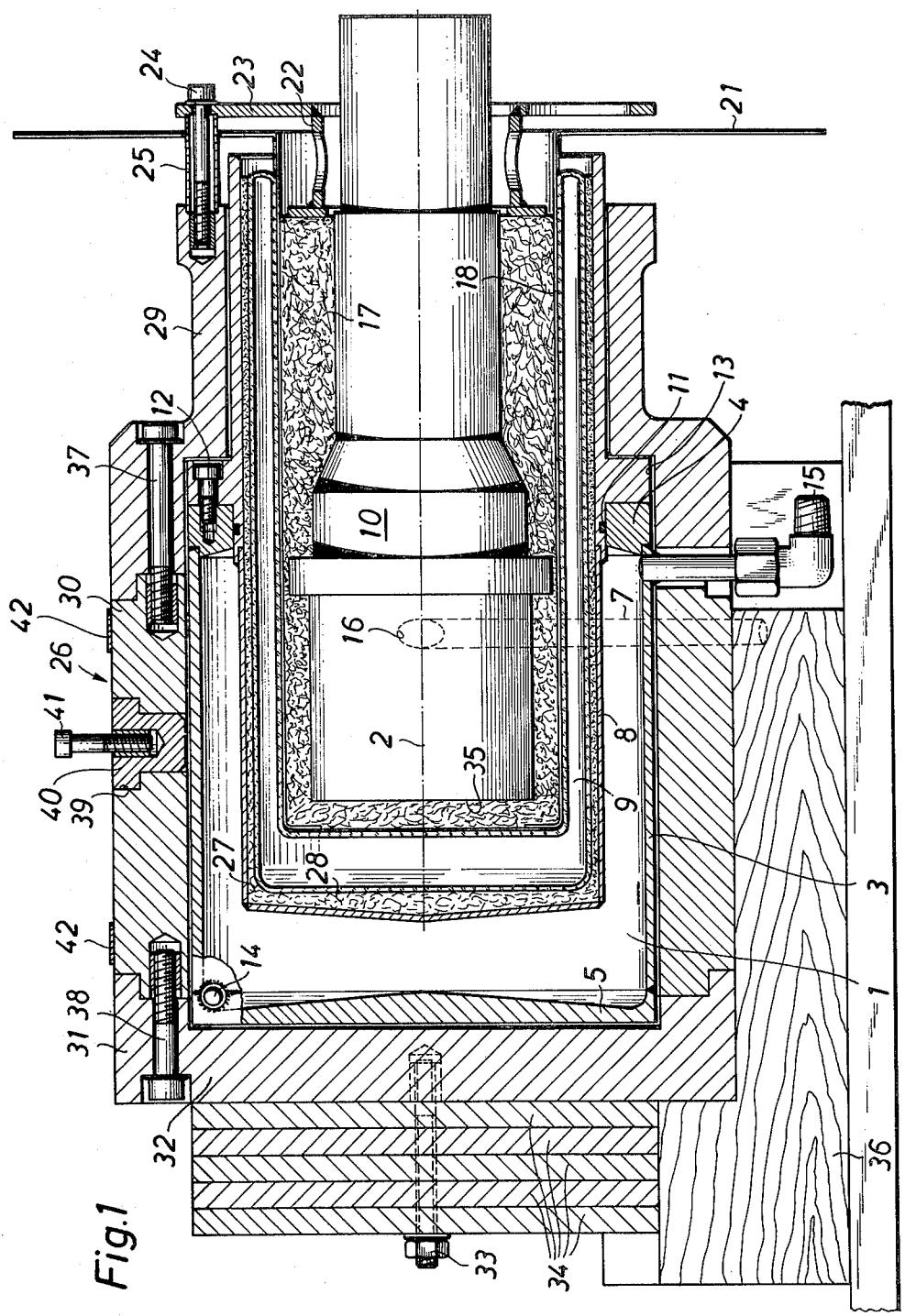
FIG. 1 is a longitudinal sectional elevational view of a preferred embodiment of the invention.
Figure 2:
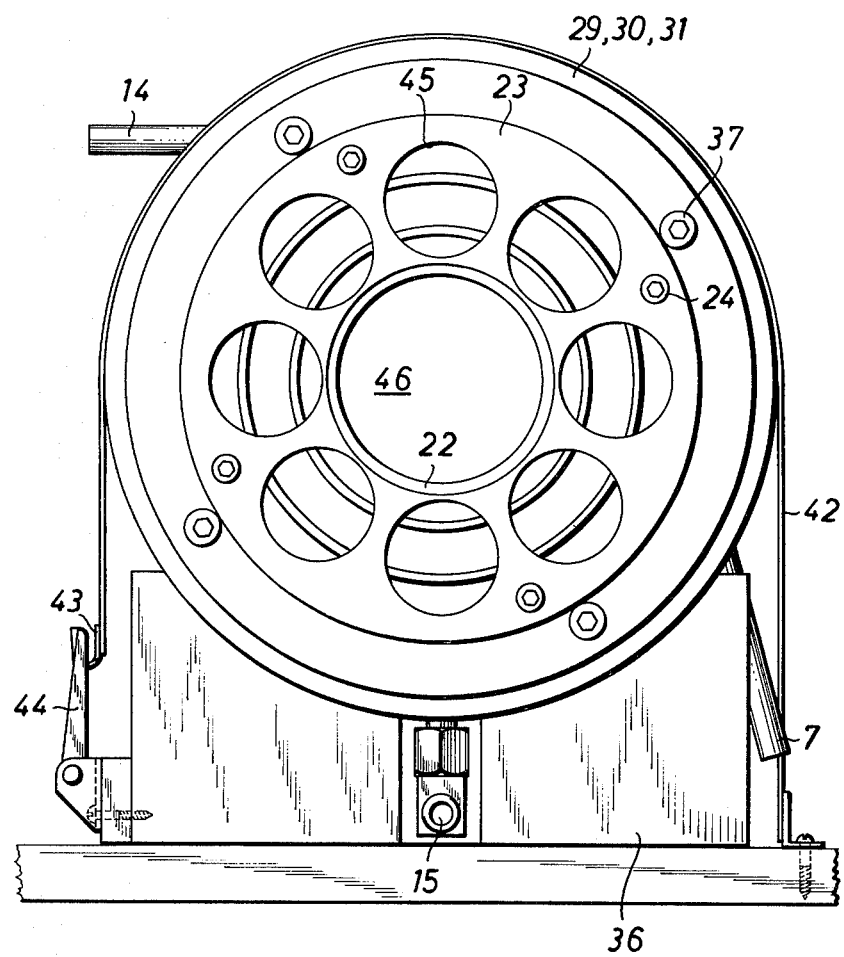
FIG. 2 is a front elevational view of the same embodiment.

Turning now to FIG. 1, there is shown a hollow outer cylinder 3 in which there is coaxially arranged a hollow inner cylinder 8 having an outer diameter which is smaller than the inner diameter of the cylinder 3. The two cylinders 3 and 8 have a substantially horizontally oriented axis 2. The space between the two cylinders 3 and 8 constitutes a flow-through chamber 1. The outer cylinder 3 has a closed radial end wall 5 which constitutes the base of the flow-through chamber 1. At the other end the cylinder 3 is provided with a circumferential ring 4. The base 5 has an inwardly convex configuration for improving the flow conditions of the carrying medium (lubricant) introduced into the chamber 1 through an inlet 7, as also shown in FIG. 2. The inner cylinder 8 serves simultaneously as the outer wall of a double-walled vacuum system 9 in which there is disposed, coaxially with the axis 2, a radiation detector assembly 10. Between the inner cylinder 8 and the circumferential ring 4 there is disposed a sealing gasket 11. The inner cylinder 8 is immobilized by means of bolts 12 which pass through a radially projecting circumferential flange 13 of the inner cylinder 8 and which may be screwed into threaded bores provided in the circumferential ring 4. The flow-through chamber 1 further has an upper outlet 14 and a lower outlet 15 for the carrier medium, such as oil. The upper outlet 14 is arranged in the vicinity of the base 5, whereas the lower outlet 15 is situated at the lowest location of the flow-through chamber 1 in the vicinity of the circumferential ring 4.

The carrier medium is driven tangentially into the flow-through chamber 1 through the opening 16 of the inlet 7 and flows around the inner cylinder 8 and thus also around the detector 10. Thereafter, the carrier medium is removed in a ratio of 5:1 (determined experimentally) through the upper and lower outlets 14 and 15, respectively. Expediently, the axis 2 of the flow-through chamber 1 is slightly inclined with respect to the horizontal to ensure that solid particles and air introduced with the carrying medium into the flow-through chamber 1 are removed therefrom through the upper outlet 14 and the lower outlet 15, respectively.

The detector 10 is mechanically supported, with the interposition of a foam material 17, by a cylinder shell 18 which is fixedly disposed within the vacuum system 9 constituted by a Dewar vessel made of glass or metal. The cylinder 18 is arranged coaxially with respect to the cylinders 3 and 8. The cylinder 18 is made of a material which has good heat conducting properties such as copper and which thus efficiently transmits residual heat into the atmosphere by means of a fin 21 attached to the cylinder 18.

The cylinder 18 is immobilized by means of a sleeve 22, a pressure ring 23 attached thereto and bolts 24 (each surrounded by a spacer sleeve 25) passing through the pressure ring 23 and held in an outer radiation shield generally indicated at 26 and provided for the entire measuring device. The wall 27 of the inner cylinder 8, which is oriented away from the measuring chamber 1, is provided with a foam material layer 28 for the thermal insulation and for the mechanical protection of the vacuum system 9.

The radiation shield 26 is formed of individual rings 29, 30 and 31 arranged in an axial series. The ring 31 has a radial surface 32 which screens the base 5 of the flow-through chamber 1. The ring 30 is preferably formed of two half shells. The three rings 29, 30 and 31 (which may be made, for example, of lead) screen, as a partial shield, the flow-through chamber 1 and the detector 10 from natural radiations from the environment. On the radial surface 32 of the ring 31 there are arranged individual discs 34 held together by means of a screw connection 33 to form a disc stack. The discs 34 provide a shield for the detector 10 or, more particularly, for its radial end 35 against additional radiations emanating from a radioactive source, that is, from the radioactively marked machine component, not shown. The partial shield 29, 30, 31, and 32 and the additional shield 34 are supported in a frame 36 which advantageously is made of wood or synthetic material. The ring 29 is supported by screws 27 and the ring 31 is supported by screws 38 on the middle ring 30.

The middle ring 30 has an opening 39 which is closed by an additional lead shield 40 serving as a plug and supporting a screw 41 which facilitates the removal of the plug 40. For the calibration process, the plug 40 is replaced by a gauge support having the same geometrical dimensions as the opening 39. The gauge support and the calibration source are not shown.

Turning once again to FIG. 2, there is shown a front elevational view of the measuring device designed according to the invention. There can be seen the frame 36 supporting the radiation shield 29, 30, 31 by means of a tensioning strap 42, a tensioning hook 43 and an anchor 44. There are further shown the upper outlet 14, the inlet 7 arranged tangentially with respect to the flow-through chamber 1 and the lower outlet 15. There are further illustrated the pressure ring 23 having openings 45 for cooling purposes as well as the screws 24 and 37 supporting the pressure ring 23 and the shield ring 29, respectively. It is further seen that the radial edge face of the sleeve 22 defines a circular opening 46 through which projects an end of the radiation detector 10, not shown in FIG. 2. The heat exchange device 18, 21 is also not shown in FIG. 2.

It will be understood that the above description of the present invention is susceptible to various modifications, changes and adaptations, and the same are intended to be comprehended within the meaning and range of equivalents of the appended claims.

What is claimed is:

1. In a device for measuring the wear of a radioactively marked machine component by sensing the presence of radioactive wear fragments in a lubricant; said device having a flow-through chamber; inlet means for tangentially introducing the lubricant into the flow-through chamber; a radiation detector at least partially surrounded by the flow-through chamber; and outlet means for removing the lubricant from the flow-through chamber; the improvement comprising
   a. an outer hollow cylinder, having a closed radial end wall and an axis;
   b. an inner hollow cylinder having a closed radial end wall and an outer diameter smaller than the inner diameter of said outer hollow cylinder; said inner hollow cylinder being supported coaxially within said outer hollow cylinder; the space between the two cylinders constituting said flow-through chamber;
   c. means for supporting said outer hollow cylinder in a substantially horizontal orientation;
   d. a vacuum vessel positioned in said inner hollow cylinder; said radiation detector being supported within said vacuum vessel coaxially with said axis;
   e. heat conducting means at least partially surrounding said radiation detector within said vacuum vessel for transmitting heat into the outer environment; and
   f. a radiation shield assembly surrounding and secured to said cylinders; said radiation shield assembly being formed of a first shield part protecting said flow-through chamber and said detector from natural environmental radiation and a second shield part protecting said flow-through chamber and said detector from the radioactive radiation emitted by the machine component.

2. A device as defined in claim 1, wherein said vacuum vessel is a double-walled structure having an inner wall and an outer wall spaced from said inner wall; said inner cylinder constituting said outer wall of said vacuum vessel.

3. A device as defined in claim 1, wherein said heat conducting means includes a cylinder shell disposed within and conforming to said inner hollow cylinder.

4. A device as defined in claim 3, wherein said cylinder shell has an axial end projecting outwardly of said inner hollow cylinder and wherein said heat conducting means further includes a fin attached to said end of said cylinder shell; said cylinder shell and said fin being made of a material having good heat conducting properties.

5. A device as claimed in claim 3, further including a cushioning material disposed between said cylinder shell and said radiation detector for protecting said radiation detector.

6. A device as defined in claim 1, wherein said radial end wall of said outer cylinder has an inner face bounding said flow-through chamber, said inner face having an inwardly convex configuration.

7. A device as defined in claim 1, wherein said outer cylinder has an axial end remote from said closed radial end wall; the improvement further comprising a circumferential ring attached to said axial end of said outer cylinder and being in engagement with said inner cylinder.

8. A device as defined in claim 7, further comprisng a sealing gasket disposed between and in engagement with said circumferential ring and said inner cylinder.

9. A device as defined in claim 7, wherein said outlet means includes an upper outlet opening into said flow-through chamber in the vicinity of said radial end wall of said outer cylinder and a lower outlet opening into said flow-through chamber in the vicinity of said circumferential ring.

10. A device as defined in claim 1, wherein said first shield part of said radiation shield assembly is formed of a plurality of shield rings arranged in an axial series and surrounding said inner and outer cylinders.

11. A device as claimed in claim 10, wherein one of said shield rings has a radial wall extending adjacent and parallel to said radial end wall of said outer cylinder; said second shield part being formed of a plurality of discs arranged as a disc stack on said radial wall of said one shield ring.

12. A device as defined in claim 10, further including means for securing said inner cylinder and said heat conducting means to one end of said shield rings.

13. A device as claimed in claim 1, further comprising a frame means and tensioning means for securing said radiation shield assembly to said frame means.

14. A device as defined in claim 13, wherein said tensioning means includes a tensioning strap at least partially surrounding said radiation shield assembly.

* * * * *